United States Patent

Meyers et al.

Patent Number: 6,013,321
Date of Patent: Jan. 11, 2000

[54] METHOD TO MANUFACTURE PHOSPHATE BONDED CERAMICS

[75] Inventors: Joseph F. Meyers, Grand Prairie; Joseph M. Wright, Southlake, both of Tex.

[73] Assignee: Lockheed Martin Corporation, Bethesda, Md.

[21] Appl. No.: 08/891,027

[22] Filed: Jun. 27, 1997

[51] Int. Cl.⁷ ................................................. B05D 3/02
[52] U.S. Cl. ................................ 427/376.1; 427/443.2; 427/294
[58] Field of Search ........................... 427/430, 443.2, 427/294, 376.1

[56] References Cited

U.S. PATENT DOCUMENTS

| | | | |
|---|---|---|---|
| 3,925,575 | 12/1975 | Church et al. | 427/226 |
| 4,655,610 | 4/1987 | Al-Jaroudi | 384/13 |
| 5,573,986 | 11/1996 | Talmy et al. | 501/97 |

OTHER PUBLICATIONS

"Ceramics and Glasses," Schneider, Samuel, J., Jr., et al., Engineered Materials Handbook, 1991 (no month).
"Processing of Silicon Nitride Ceramics Using Phosphate Bonding Techniques," Talmy, I. G., et al., 16th Conference on Metal Matrix Composites, 1992 (no month).
"Phosphate Bonding in Processing of Non–Oxide Ceramics," Talmy, I. G., et al., 15th Metal Matrix, Carbon, Ceramic Matrix Composites, 1991 (no month).
Dictionary of Ceramic Science and Engineering, 2nd Ed., McColm, Ian J., 1994 (no month).

*Primary Examiner*—Shrive Beck
*Assistant Examiner*—Paul D. Strain
*Attorney, Agent, or Firm*—Sidley & Austin

[57] ABSTRACT

Methods useful in the manufacture of phosphate bonded ceramics. The invention is a method for impregnation of a green body to be fired to form a ceramic having the steps of: (a) forming a green body of unreacted ceramic materials; (b) determining the pore volume of the green body; (c) determining the amount of phosphoric acid required to react with the green body at a desired level; (d) making in impregnation solution of phosphoric acid and a carrier liquid having a ratio of phosphoric acid to carrier liquid equal to the ratio of (i) the volume of phosphoric acid determined for the reaction with the green body to (ii) the volume of carrier fluid equal to the pore volume of the green body minus the volume of the phosphoric acid determined for the reaction; (e) impregnating the green body with said solution of phosphoric acid and carrier fluid; and (f) firing the impregnated green body to form a phosphate bonded ceramic.

14 Claims, 1 Drawing Sheet

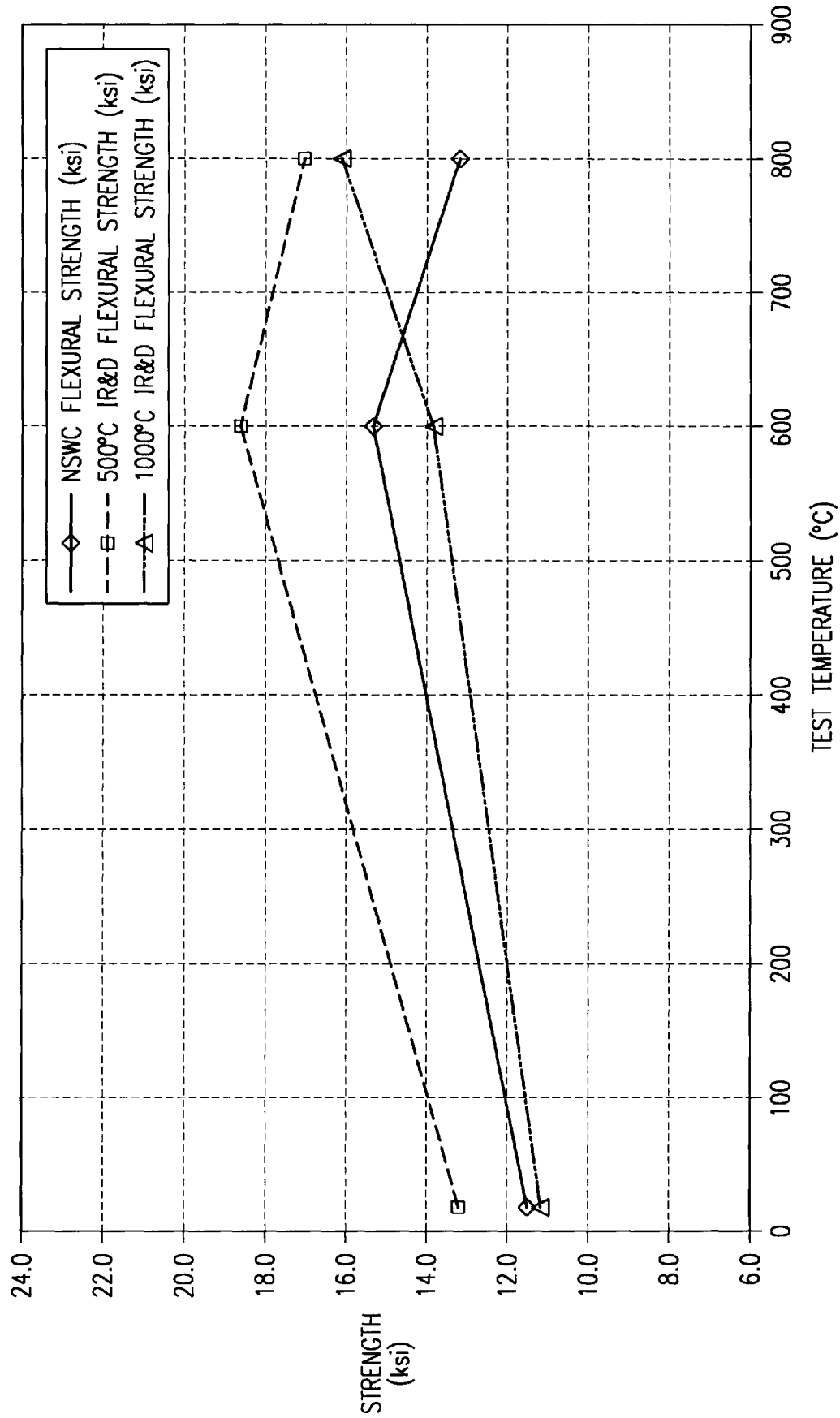

METHOD TO MANUFACTURE PHOSPHATE BONDED CERAMICS

TECHNICAL FIELD

The present invention relates to a method useful in the manufacture of ceramics and in particular a method usefull in the manufacture of phosphate bonded ceramics. The process also provides a method for impregnating reactants into green ceramic bodies prior to firing.

BACKGROUND OF THE INVENTION

Ceramics find many applications in consumer products and in industrial or commercial products. Ceramics can be manufactured with many different characteristics. The characteristics of ceramics can vary based upon a number of factors; such as, the base composition of the ceramic, additives of the ceramic, processing conditions, and post-forming treatments.

Ceramics may be classified in many ways one of which is use. There is a group of ceramics which may be called high volume commodity ceramics. These can be considered low value added products such as brick, tile, pottery, abrasive grains, etc. At the other extreme are fine ceramics which are typically low volume speciality ceramics. Such ceramics can include (1) electronic ceramics, such as dielectrics, ferroelectrics, ferromagnetic, piezoelectrics; (2) structural ceramics which are typically fracture resistant materials such as silicon nitride ($Si_3N_4$), silicon carbide (SiC) and toughened zirconium dioxide ($ZrO_2$); (3) water resistant ceramics such as carbides, nitrides and borides; (4) optical ceramics and (5) bioceramics for in-body use.

The processing of ceramics is complicated by the number of steps typically required for manufacture and the need to optimize the processing steps. The processing of ceramics is extremely important because ceramics are basically flaw intolerant materials. As a result, minor chemical and physical defects can severely degrade properties. Proper selection of raw materials and processing conditions is especially important in ceramics because mistakes generally cannot be corrected during the firing and post-firing processes.

Currently many ceramics of industrial interest are made from carbides, silicon nitride and silicon oxide. While these materials are useful, there has been continuing investigation and need of more economical materials which can be processed into ceramic products without undue cost. Phosphate bonded ceramics have been suggested of interest; however, the absence of a commercially feasible process has limited their development. Thus, there has been a continuing need to provide a process which allows improved quality, while achieving more efficient production. The present invention allows the production of stronger phosphate bonded ceramic product with less flaws more economically.

In structural ceramics there has been a continual search for less expensive reagents which could be processed in a manner that would provide a commercially feasible process. The fabrication of phosphate bonded ceramics involves the reaction of phosphoric acid with a metal oxide such as zirconium. The Naval Surface Warfare Center (NSWC) developed a process in which zirconium phosphate bonded with silicon nitride (ZBPSN). This process is described in U.S. Pat. No. 5,573,986. The reaction is shown below:

$$Zro_2 + 2H_3PO_4(lq) + Si_3N_4 \rightarrow ZrP_2O_7 + 3H_2O(g) + Si_3N_4$$

wherein lq means liquid and where g means gas. The NSWC process involved the following steps: (a) first a blend of the zirconium oxide and silicon nitride powders was prepared, (b) the blend was mixed with phosphoric acid, (c) this mixture of phosphoric acid and powder was then formed into the green body by cold isostatic pressing (CIP'ing) of the mixture, and (d) the green body was then fired to form the ceramic. The term "green body" indicates a desired shape formed from all or part of the ceramic reactants prior to the firing of that body to form the ceramic; in other words, a body formed from unfired reactants. The NSWC process has significant drawbacks. The amount of phosphoric acid required to produce a stoichiometric zirconium phosphate was very small and the acid needed to be uniformly mixed with the ceramic powders. The addition of a small amount of liquids, such as acid, to powder is difficult, and it is particularly hard to achieve mixing in such a manner that the acid is evenly distributed throughout the mixture. Mixing in accordance with the NSWC method many times produced inconsistent results and complicated the green body formation because achieving a homogeneous blend of the acid and powders was very difficult to achieve. Some of the difficulties which occurred in the NSWS phosphate bonded ceramic process were:

1. The resulting "damp" powder-acid mix had poor flow characteristics resulting in uneven packing during cold isostatic pressing. This produced density variations in the fired ceramic. This resulted in wide variations in the structural strength of the final ceramic.

2. Extensive labor was required to distribute the acid into the mixture and it was very difficult to achieve uniform distribution. As a result the fired ceramic was difficult to make homogeneous and as a result would suffer in strength and electrical performance (for those ceramics intended for electrical applications).

3. Acid being corrosive and added in the initial process steps increased the likelihood of damage to equipment, corrosion to tooling, and also possibly injury to the personnel.

The present invention has the advantages that it allows for a homogeneous mixing of the acid with the solid reactants, provides an economical process, produces a fired phosphate bonded ceramic with improved strength over prior methods, minimizes risk to personnel and equipment by handling acid, and has other advantages.

SUMMARY OF THE INVENTION

The present invention relates to methods useful in the manufacture of phosphate bonded ceramics. In one embodiment, the present invention is a method for impregnation of a green body to be fired to form a ceramic which has the steps of :(a) forming a green body of unreacted ceramic materials; (b) determining the pore volume of the green body; (c) determining the amount of phosphoric acid required to react with the green body at a desired level; (d) making in impregnation solution of phosphoric acid and a carrier liquid having a ratio of phosphoric acid to carrier liquid equal to the ratio of (i) the volume of phosphoric acid determined for the reaction with the green body to (ii) the volume of carrier fluid equal to the pore volume of the green body minus the volume of the phosphoric acid determined for the reaction; and (e) impregnating the green body with said solution of phosphoric acid and carrier fluid. In the preferred embodiment the amount of phosphoric acid used is the stiochiometric amount for the weight of the green body.

In another embodiment, the present invention provides a method for preparation of a material to be phosphate bonded to form a ceramic having the steps of: (a)mixing a metal oxide with $Si_3N_4$ in predetermined amounts; (b) pressing the admixture into to a green body; (d) determining the pore volume of the green body; (e) determining the amount of phosphoric acid required to react with the green body at a predetermined amount; (f) making in impregnation solution of phosphoric acid and a carrier liquid having a ratio of phosphoric acid to carrier liquid equal to the ratio of (i) the volume of phosphoric acid determined for the reaction to the (ii) volume of carrier fluid equal to the pore volume of the green body minus the volume of the phosphoric acid determined for the reaction; (g) impregnating the green body with said solution of phosphoric acid and carrier fluid. Thereafter, the green body which has been impregnated is fired.

In yet another embodiment of the present invention, a method to form a phosphate bonded ceramic is provided in which involves the steps of (a) mixing a metal oxide with $Si_3N_4$ in a predetermined amount by wet ball milling; (b) drying the wet mixture to remove the milling solution from the mixture; (c) forming a green body from said mixture; (d) determining the pore volume of said green body; (e) determining the amount of phosphoric acid required to react with the green body at a desired level; (f) making in impregnation solution of phosphoric acid and a carrier liquid having a ratio of phosphoric acid to carrier liquid equal to the ratio of (1) the volume of phosphoric acid determined for the reaction to (2) the volume of carrier fluid equal to the pore volume of the green body minus the volume of the phosphoric acid determined for the reaction; (g) immersing the green body in the impregnation solution; (h) impregnating the green body with said impregnation solution of phosphoric acid and carrier fluid; and (i) firing the green body to form a phosphate bonded ceramic.

The impregnation of the green body is preferably preformed by immersing the green body in the impregnation solution so that it is completely covered, drawing a vacuum over the solution to remove air from the green body, followed by removal of vacuum and allowing the green body to remain in the impregnation solution under ambient atmosperic pressure or at an elevated pressure for a period of time sufficient to allow the impregnation solution to flow into the pores of the green body.

BRIEF DESCRIPTION OF THE DRAWINGS

The invention can better be understood by reference to the following FIGURE:

FIG. 1 is a graph showing results of strength testing of phosphate bonded ceramics made in accordance with the present invention in comparison to phosphate bonded ceramics made in accordance with the method of the prior art.

DETAILED DESCRIPTION OF THE INVENTION

The present invention will be described in relation to its preferred embodiment which is the production of phosphate bonded ceramics. The techniques utilized in this invention can be applied to other ceramics in which it is necessary to intimately mix solid ceramic reactants (5) with a liquid reactants.

For purposes of discussion and illustration the preparation of the phosphate bonded ceramic will be used to describe the invention. The preferred process results in a ceramic derived from a combination of zirconium phosphate with silicon nitride. The reaction involved is that as described above $Zro_2 + 2H_3PO_4(lq) + Si_3N_4 \rightarrow ZrP_2O_7 + 3H_2O(g) + Si_3N_4$.

It will be understood that the method of the present invention is useful for any phosphate bonded ceramic. Thus, the general expression of suitable reactions is a metal oxide plus phosphoric acid yields water and a metal phosphate bonded to ceramic nitrides and carbides. Suitable metal oxides for use in phosphate bonded ceramics are Al, Cr, B, Si, Fe, Ti or mixtures thereof The various metals oxides and combinations of metal oxides can be selected to permit some control or selection of setting time, temperature and viscosity which allow for significant processing flexibility. However, the metal oxides selected also affect the characteristics of the fired ceramic; such as, thermal stability, strength, thermal expansion ratio and chemical resistance. Thus, the selection of the particular metal oxides or mixture of metal oxides is a balancing between desirable processing conditions and final product characteristics. The method of the present invention can be used with other ceramic compositions.

The solid components utilized to make the phosphated bonded ceramic are usually received in a powder form. If they are not received in a powder form then a step to render them a powder can be performed. Particular sizes of the powders about 1 micron or less have been found useful. Sufficient quantities of powder are measured in a predetermined amount. This predetermined amount is that amount sufficient to supply enough mass to form the finished ceramic and to provide the desired stoichiometric ratio between the reactants. Preferably the powders are weighed out to provide the stoichiometric amount needed for the reaction. The powders can be weighed such that the ratio of the weight of the powders favors one side of the stoichiometry.

The powders are mixed and preferably are mixed in a wet ball mill. Powders can be mixed in a dry ball mill, however, it has been found that it is more efficient and easy to ball mill the powders in a liquid carrier. This ball milling typically is not to provide a reduction in particle size of the solid components but rather to achieve a homogeneous mixture. Ball milling is not required. Any method which achieves a homogeneous mixture of the constituents is acceptable. Wet ball milling with any suitable milling solution is preferred.

When wet ball milling is to be followed by spray drying it has been found that a milling solution having any suitable dispersant, binder, or mixture of dispersant and binders can be utilized. For example, the following mixture has been found useful for milling zirconium oxide and silicon nitride: 3% by weight of dispersant, 2% by weight binder, 0.5% by weight polyethylene glycol and the remainder deionized water. The binder can be any appropriate binder, for example, Aquazol sold by Polymer Chemical Innovations, State College, Pennsylvania. The dispersant can be any appropriate dispersant, for example, AMP95 sold by Angus Chemical Co., Northbrook, Ill.

Once the mixture has been thoroughly ball milled into a homogeneous mixture it can then be dried to eliminate excess milling solution, dispersants and binders. Preferably this drying is accomplished by spray drying in which the mixture is ejected in fine droplets which coalesce and form small spheres of the solid reactant mixture to be used for green body preparation. Spray drying is described more fully in "Engineered Materials Handbook", Vol. 4, Ceramics and glasses, pgs. 102–107, ASM International Handbook Committee 1991.

The mixed powder is then formed into a green body of the desired shape by any suitable method such as cold isostatic pressing. Pressing is performed at sufficient pressure to consolidate powder sufficiently that it may be handled. Cold isostatic pressing at 15 to 50 ksi has been found useful.

The formed green body is then heated in order to oxidize the organic additives which may have been added for purposes of ball milling and/or spray drying. Initial thermal processing is conducted to burn out organic additives and impurities, remove chemically bound water and water of crystallization, and to decompose organic precursors or additives. This thermal processing can be accomplished by a separate heat treatment well below the firing temperature, or in a controlled series of ramps and isothermal holds in a single heat treatment process. These firing methods are well known in the art and the temperatures, ramps, and time periods are selected depending on liquid composition and content, nature of organic additives and impurities.

Preferably, the pore volume determination is performed at room temperature. Thereafter, the green body is tested to measure the pore volume of the green body. The pore volume of the green body may be measured by any suitable technique, such as the Archimedes method, ASTM C-20, and modified ASTM-20 procedure. Applicants have found a modified ASTM-20 procedure useful in which a vacuum is applied to remove air from the pores; instead of the ASTM method of heating the liquid in order to release air from the pores. From the measurement of the pore volume of the green body, the sample weight and the sample density, the amount of impregnating liquid needed to react with the solid component is determined. The impregnation liquid is a mixture of phosphoric acid with a carrier liquid. From the weight of the solid components of the green body, the amount of phosphoric acid needed to react with the components is calculated. This amount may be less than the stoichiometric ratio, equal to the stoichiometric ratio or in excess of the stoichiometric ratio. The volume of phosphoric acid needed to provide the predetermined amount of acid is calculated. The volume of acid used is less than the volume of the pores in the green body for the desired stoichiometric ratio. The amount of acid will vary with the weight of the green body. It has been found that the volume of carrier needed to fill the green body pore volume which is in excess of the volume of the phosphoric acid needed to react with the green body is determined. Thus the relationship is GBPV=PAV+CV where
 GBPV=green body pore volume
 PAV=phosphoric acid volume (this volume is computed for 100% phosphoric acid and values must be adjusted appropriately if dilute phosphoric acid is used)
 CV=carrier liquid volume Thereafter, an impregnation solution can be prepared in the desired quantity by mixing phosphoric acid and carrier liquid in a ration of PAV:CV. Sufficient impregnation liquid should be prepared such that the green body can be completely immersed in the solution.

Preferably, the amount of phosphoric acid utilized is equal to or greater than the stoichiometric amount needed to react with the solid components. Generally, it is preferred to react all of the metal oxide. Thus, sufficient phosphoric acid to achieve complete reaction is desired, in some cases it may be necessary to use an excess of acid. One way to determine the efficiency of the reaction is to test a sample of the fired ceramic by X-ray diffraction.

Once the amount of phosphoric acid is determined and the amount of carrier liquid needed to be added to the acid to fill the pores is determined, a solution is prepared with that ratio of acid to diluent equal to PAV:CV.. The carrier liquid can be water or any other suitable low boiling liquid such as alcohols, ketones, aromatics and aliphatic liquid with less than ten carbon atoms. Carrier liquids which have been found useful include water, toluene, methyl ethyl ketone, isopropyl alcohol and acetone.

The green body is impregnated with the impregnation liquid. Preferably this is done by immersing a part in the impregnation liquid carrier (acid and carrier), and pulling a vacuum over the container to eliminate all air and gas bubbles from the sample and causing the impregnation liquid to flow into all of the pores. The impregnating liquid and immersed green body are then preferably held at ambient or elevated pressure for a period of time to ensure complete filling of the pore volume.

Thereafter the sample is removed from the impregnation liquid and is subject to a firing cycle to form the ceramic. In the preferred embodiment, a drying step is used before firing or the firing cycle includes an initial drying cycle which causes the excess impregnation liquid to evaporate from the pores at a rate which does not harm the green body.

Firing of the green body is done at any a suitable temperature and time. Generally, this has been a temperature of about 900° C. or more and over a period of 0.5 to 5 hours. Firing times depend upon temperature, size and shape of the green body. During firing the cohesiveness of the green body increases because the chemical reaction of the reactants to anhydrous phosphate. The firing temperatures and times can affect the physical properties of the fired ceramic. Therefore, experimentation can determine the particular firing practices most suitable for a particular ceramic. Thus, the green body can be fired at predetermined conditions which are not within the preferred ranges set out in this description.

EXAMPLES

The following examples illustrate the method of the present invention.

Example 1. A mixture of 211.6 grams of $Si_3N_4$ sold under the trade designation Stark LC-12S was mixed with 29.9 grams zirconium oxide ($ZrO_2$) sold by Magnesium Eltrektron. The powders and 350 grams of isopropyl alcohol were charged to a ball mill which was a ceramic lined mill with ceramic media. The mixture was ball milled for 4 hours.

The powder was removed from the ball mill and stir dried. Stir drying means agitation while heating to prevent material separation. The powder was placed in a container and dried overnight in an oven at 100° C., resulting in a dried cake. In the morning the powder was mulled through a number 40 mesh screen (U.S. standard). A CIP billet was formed from about 100 gms. of the powder. The cold isostatic pressing was done at 30 ksi. The billet was cut into slabs for testing and processing.

Thereafter, one of the samples was put into a container having deionized $H_2O$. A vacuum was then pulled in order to draw air out of the green body sample such that the water would flow into the pores of the green body. A vacuum of less than 100 mm Hg was applied for 60 minutes. The vacuum was removed and the sample was allowed to stand in the water for one hour at ambient conditions (approximately 22° C. and 760 mm/Hg) to ensure more than sufficient time for water to penetrate all of the pores. Thereafter, the pore volume of the green body was calculated. From this calculation of pore volume and knowing the weight of the sample, an impregnation solution of phosphoric acid and a carrier fluid was made having the composition in the proportions of: (a) the volume of a stoichiometric amount of phosphoric acid for the sample weight to (b) the pore volume of the green body minus the volume of phosphoric acid. Different carrier liquids were used for the various green body samples.

Table I illustrates the results.

TABLE I

| Sample # | Carrier Liquid | Initial Sample dry wt. (g) | Sample vol. (cm³) | Green Body Pore Vol. (cm³) | Impregnated wt. (g) | Fired Density | % Theoretical Density |
|---|---|---|---|---|---|---|---|
| 1 | water | 153.62 | 77.312 | 30.00 | 200.394 | 2.337 | 69.8 |
| 2 | toluene | 8.673 | 4.365 | 1.694 | 11.223 | 2.392 | 71.4 |
| 3 | MEK[1] | 10.532 | 5.3 | 2.057 | 13.072 | 2.304 | 68.8 |
| 4 | IPA[2] | 9.686 | 4.875 | 1.892 | 11.957 | 2.298 | 68.6 |
| 5 | acetone | 10.837 | 5.454 | 2.116 | 13.774 | 2.343 | 69.9 |

[1]MEK = methyl ethyl ketone
[2]IPA = isopropyl alcohol

The green body samples were fired by placing it in an oven preheated to 100° C. and ramping the oven to 300° C. in 20 hours. The sample was held at 300° C. for one hour. The sample was then ramped from 300° C. to 900° C. in 9 hours. The sample was held at 900° C. for 5 hours. Then the sample was cooled to room temperature over 8.8 hours. Thereafter, the density of the samples was measured as reported in Table I and the percent of theoretical density calculated. The percent of theoretical density achieved by this method was equal to that achieved by the NSWC process. X-ray diffraction examination, however, showed a much smaller level of $Zro_2$ remaining in fired ceramics made by this method than ones made by the NSWC process.

EXAMPLE 2.

The mixture of $Si_3N_4$ and $ZrO_2$ powders was made in the ratio specified in Example 1. One batch using this ratio was prepared by adding to the solids a milling solution such that the mixture of milling solution and solids was 25% by volume solids. The milling solution consisted of 3 wt. % of an amino alcohol dispersant, AMP95, sold by Angus Chemical Co., Northbrook, Ill.; 2 wt. % of a binder, Aquazol, a polyoxazoline sold by Polymer Chemical Innovations, State College, Pennsylvania; 0.5 wt. % of polyethylene glycol, and remainder of deionized water. The solids with the milling solution were ball milled for four hours. The samples were then spray dried using an inlet temperature of 250° C. After spray drying, the powder was compressed into a green body with cold isostatic pressure applied at 30 ksi for ten minutes.

One green body sample A was heated in order to remove the milling solution and to bum up the adjuvants used in the milling solution. This was done by ramping one of the samples from room temperature to 500° C. at a rate of 1.5° C. per minute for 5.3 hours, holding the sample at 500° C. for two hours and then cooling the sample slowly to room temperature. The second sample B was prepared by ramping sample B from room temperature to 500° C. at a rate of 1.5° C./min for 5.3 hours, and then ramping 500° C. to 1000° C. at the rate of 5° C. per minute. The sample was then held for two hours at 1000° C. and thereafter cooled slowly to room temperature.

Thereafter, the pore volume of the green bodies was determined by modified ASTM 20 method. The samples were submerged in the ionized water. A vacuum was pulled over the sample in water at a pressure of less than 100 mm Hg for one hour. The vacuum was removed and the sample was allowed to sit submerged in the water for one hour at ambient conditions (approximately 22° C. and 760 mm/Hg). Thereafter, the samples were weighed. From the recorded dry weight, wet weight, and suspended weight the pore volume of the green bodies were determined.

Thereafter, the volume of a stoichiometric amount of acid to react the weight of each green body was determined. Thereafter, the weight of acid was converted into volume of acid. The volume of acid was subtracted from the volume of the pore space of the green body to determine the volume of carrier liquid needed to be mixed with the volume of phosphoric acid to completely fill the pores of the green body. The volumes of the phosphoric acid and carrier fluid determined, then provided the ratio for mixing an impregnation liquid (acid/carrier) solution of sufficient quantity to fully cover each of the green bodies.

Acid was impregnated into each of the green bodies. This was done by immersing the samples in the acid/carrier solution, pulling a vacuum over the sample and acid solution at a pressure of less than 100 mm Hg for a period of 30 minutes. Thereafter, the vacuum was removed and the sample was allowed to set at ambient conditions (approximately 22° C. and 760 mm/Hg) for two hours.

The samples were fired. The firing cycle utilized was to place the samples in an oven a set point of 50° C. The oven was then ramped to 100° C. in two hours. The sample was held at 100° C. for 5 hours and then ramped to 300° C. over 20 hours at a rate of 1° C./min. The samples were held at 300° C. for one hour and then ramped from 300° C. to 900° C. over nine hours. They were held at 900° C. for five hours and then the temperature was reduced to room temperature for over 8.8 hours.

The samples prepared by this process were then tested and compared to samples made according to the NSWC process. The results are set forth in Table II below. As will be noted from these results the temperature at which the is removed from the green body can affect strength of the final fired ceramic. The flexure strength of samples was determined at different temperatures. As can be seen, the strength can vary depending upon the sample temperature. Also as can be seen, the temperature at which the additives are burned out of the green body can have significant effect on strength of the fired ceramic. Drying the green body at 500° C. v. 1000° C. resulted in a fired ceramic having greater strength. Thus, some experimentation may be required to find optimum processing conditions for different metal oxides, different dispersants and binders.

While not wishing to be bound by any particular theory it is believed that the higher temperature resulted in the decomposition of silicon nitride to silicon oxide and nitrogen. Thus, when phosphoric acid was added, firing of the sample produced silicon phosphate which would increase the high temperature ductility. Thus, it appears that the lower drying temperatures of the green body are desirable.

TABLE II

| | | IMPREGNATION SAMPLES | |
|---|---|---|---|
| Test Temperature (° C.) | NSWC Flexural Strength (ksi) | Sample A Flexural Strength (ksi) | Sample B Flexural Strength (ksi) |
| 20 | 11.4 | 13.0 | 11.1 |
| 600 | 15.3 | 18.7 | 13.9 |
| 800 | 13.1 | 17.1 | 16.2 |

| Test Temperature (° C.) | NSWC Strain-to-Failure (%) | 500° C. IR&D Strain-to-Failure (%) | 1000° C. IR&D Strain-to-Failure (%) |
|---|---|---|---|
| 20 | 0.018 | 0.039 | 0.035 |
| 600 | 0.022 | 0.051 | 0.048 |
| 800 | 0.032 | 0.051 | 0.058 |

A sample made by the spray dry technique as described in Example 2 above was tested by x-ray diffraction. This x-ray diffraction revealed minimal detectible level of zirconia. In contrast, a comparative example made pursuant to the NWSC method had measurable peaks of unreacted zirconia.

A flexural test was also conducted of these samples. The flexural test showed that the parts made by the present invention had approximately 20% greater strength than those made by the prior art NSWC method. These flex tests were conducted in accordance with MIL standard 1942A.

Samples made according to the present invention were also viewed under a scanning electron microscope and compared with samples made pursuant to the NSWC method. This testing revealed that the microstructure were the same.

From the foregoing it can be concluded that the method of the present invention results in a more improved ceramic, i.e., phosphoric acid distribution, in the green body made from zirconia oxide and silicon nitride. This more homogeneous mixture of the acid and more intimate contact with the powder reactants in the green body results in a more uniform ceramic, more uniform grain size and greater strength with less flaws and imperfections in the final green body.

The present invention has many advantages over the prior art. First, the acid, liquid reactant, is uniformly distributed throughout the green body ceramic. X-ray diffraction analysis of a sample prepared according to the prior NWSC method and the current method demonstrate that the method of the present invention achieves uniform distribution of the acid throughout the ceramic. X-ray diffraction analysis indicates that in the present invention there is a smaller amount of unreacted $ZrO_2$ for the impregnated material versus the prior process. The current process allows for handling and using the acid in a dilute solution thereby minimizing the harmful effects to processing equipment and personnel. The packing of the green body with the present invention can be achieved in a more uniform manner because the powders are dry. This allows more uniform compaction than the prior method where the powder was damp with the phosphoric acid reactant.

The foregoing examples and description are of the preferred embodiments and are not in any limiting.

What is claimed is:

1. A method for preparation of a material to be phosphate bonded to form a ceramic comprising:
    (a) mixing a metal oxide in a solid state with $Si_3N_4$ in a solid state in a predetermined amount;
    (b) pressing the admixture into a green body;
    (c) determining the pore volume of said green body;
    (d) determining the amount of phosphoric acid required to react with said green body at a predetermined amount;
    (e) making an impregnation solution of phosphoric acid and a carrier liquid having a ratio of phosphoric acid to carrier liquid equal to the ratio of (a) the volume of phosphoric acid determined for the reaction; (b) a volume of carrier fluid equal to the pore volume of the green body minus the volume of the phosphoric acid determined for the reaction; and
    (f) impregnating said green body with said solution of phosphoric acid and carrier fluid.

2. The method of claim 1 wherein said carrier liquid is selected from the group consisting of water, methyl ethyl ketone, isopropyl alcohol, and acetone.

3. The method of claim 2 wherein said metal oxide is zirconium.

4. A method of claim 1 further comprising the step of firing the inpregnated green body to form a phosphate bonded ceramic.

5. The method of claim 1 wherein the impregnation of the green body further comprises the steps of (i) immersing the green body in the impregnation solution, (ii) drawing a vacuum over the impregnation containing the green body to remove gas from the green body, and (iii) removing the vacuum and allowing the green body to remain in the impregnation solution for a sufficient time to allow the impregnation solution to flow into the pores of the green body.

6. The method of claim 1 wherein the amount of phosphoric acid is equal to or greater than the stoichiometric amount.

7. The method of claim 1 wherein said metal oxide is selected from the group consisting of zirconium, aluminum, iron, boron, chromium, silicon, titanium and mixtures thereof.

8. The method of claim 2 wherein said metal oxide is selected from the group consisting of zirconium, aluminum, iron, boron, chromium, silicon, titanium and mixtures thereof.

9. The method of claim 7 wherein said metal oxide is zirconium.

10. A method of forming a phosphate bonded ceramic comprising:
    (a) mixing a metal oxide in a solid state with $Si_3N_4$ in a solid state in a predetermined amount;
    (b) spray drying said mixture of metal oxide and $Si_3N_4$;
    (c) forming a green body from said mixture;

(d) determining the pore volume of said green body;

(e) determining the amount of phosphoric acid required to react with said green body at a desired level;

(f) making an impregnation solution of phosphoric acid and a carrier liquid having a ratio of phosphoric acid to carrier liquid equal to the ratio of (a) the volume of phosphoric acid determined for the reaction; (b) a volume of carrier fluid equal to the pore volume of said green body minus the volume of the phosphoric acid determined for the reaction;

(g) impregnating said green body with said solution of phosphoric acid and carrier fluid; and (h) firing said green body to form a phosphate bonded ceramic.

11. The method of claim 10 wherein said mixing is carried out in a milling solution.

12. A method of claim 11 wherein said milling solution contains dispersants and binders.

13. The method of claim 10 wherein the impregnation of the green body further comprises the steps of (i) immersing the green body in the impregnation solution, (ii) drawing a vacuum over the impregnation containing the green body to remove gas from the green body, and (iii) removing the vacuum and allowing the green body to remain in the impregnation solution for a sufficient time to allow the impregnation solution to flow into the pores of the green body.

14. A method for preparation of a material to be phosphate bonded to form a ceramic comprising:

(a) mixing a metal oxide in a solid state with $Si_3N_4$ in a solid state in a predetermined amount;

(b) forming a green body from said mixture at ambient temperature;

(c) determining the pore volume of said green body;

(d) determining the amount of phosphoric acid required to react with said green body at a desired level;

(e) making an impregnation solution of phosphoric acid and a carrier liquid having a ratio of phosphoric acid to carrier liquid equal to the ratio of (a) the volume of phosphoric acid determined for the reaction; (b) a volume of carrier fluid equal to the pore volume of said green body minus the volume of the phosphoric acid determined for the reaction;

(f) impregnating said green body with said solution of phosphoric acid and carrier fluid before heating of said green body to react said green body; and (g) firing said green body to form a phosphate bonded ceramic.

* * * * *

UNITED STATES PATENT AND TRADEMARK OFFICE
CERTIFICATE OF CORRECTION

PATENT NO : 6,013,321

DATED : January 11, 2000

INVENTOR(S): Joseph F. MEYERS and Joseph M. WRIGHT

It is certified that error appears in the above-identified patent and that said Letters Patent is hereby corrected as shown below:

Cover page, [57] Abstract, line 7, delete "in", and insert --an--.

Column 2, line 54, delete "in", and insert --an--.

Column 3, line 4, delete "in", and insert --an--.

Column 3, line 10, after "reaction;", insert --and--.

Column 3, line 14, delete "in".

Column 3, line 21, delete "in", and insert --an--.

Column 3, line 23, delete "(1)", and insert --(i)--.

Column 3, line 25, delete "(2)", and insert --(ii)--.

UNITED STATES PATENT AND TRADEMARK OFFICE
CERTIFICATE OF CORRECTION

PATENT NO : 6,013,321

DATED : January 11, 2000

INVENTOR(S): Joseph F. MEYERS and Joseph M. WRIGHT

It is certified that error appears in the above-identified patent and that said Letters Patent is hereby corrected as shown below:

Column 3, line 58, delete "a".

Column 4, line 5, after "thereof", insert --.--.

Column 4, line 5, delete "metals", and insert --metal--.

Column 4, line 61, delete "glasses", and insert --Glasses--.

Column 5, line 64, after "PAV:CV", delete the second period.

Column 6, line 18, delete "a".

Column 8, line 49, after the second instance of "the", insert --sample--.

UNITED STATES PATENT AND TRADEMARK OFFICE
CERTIFICATE OF CORRECTION

PATENT NO : 6,013,321

DATED : January 11, 2000

INVENTOR(S): Joseph F. MEYERS and Joseph M. WRIGHT

It is certified that error appears in the above-identified patent and that said Letters Patent is hereby corrected as shown below:

Column 8, line 49, after "is", insert --heated to--.

Column 8, line 49, delete "removed", and insert --remove the milling solution--.

Signed and Sealed this

Eighth Day of May, 2001

NICHOLAS P. GODICI

*Attest:*

*Attesting Officer*   Acting Director of the United States Patent and Trademark Office